(12) United States Patent
Yamada

(10) Patent No.: US 11,609,732 B2
(45) Date of Patent: Mar. 21, 2023

(54) INFORMATION PROCESSING DEVICE DISPLAYING DATABASE IMAGE IN FIRST DISPLAY REGION AND PARTIAL ENLARGED IMAGE IN SECOND DISPLAY REGION

(71) Applicant: BROTHER KOGYO KABUSHIKI KAISHA, Nagoya (JP)

(72) Inventor: Jun Yamada, Nagoya (JP)

(73) Assignee: BROTHER KOGYO KABUSHIKI KAISHA, Nagoya (JP)

(*) Notice: Subject to any disclaimer, the term of this patent is extended or adjusted under 35 U.S.C. 154(b) by 0 days.

(21) Appl. No.: 17/570,049

(22) Filed: Jan. 6, 2022

(65) Prior Publication Data
US 2022/0222022 A1    Jul. 14, 2022

(30) Foreign Application Priority Data
Jan. 14, 2021    (JP) .............................. JP2021-004379

(51) Int. Cl.
| | | |
|---|---|---|
| *G06F 3/12* | (2006.01) | |
| *G06F 3/04845* | (2022.01) | |
| *G06F 3/0488* | (2022.01) | |
| *G06F 40/177* | (2020.01) | |
| *G06F 40/106* | (2020.01) | |
| *G06F 3/04842* | (2022.01) | |

(52) U.S. Cl.
CPC .......... *G06F 3/1256* (2013.01); *G06F 3/0488* (2013.01); *G06F 3/04842* (2013.01); *G06F 3/04845* (2013.01); *G06F 3/1208* (2013.01); *G06F 40/106* (2020.01); *G06F 40/177* (2020.01); *G06F 2203/04803* (2013.01); *G06F 2203/04808* (2013.01)

(58) Field of Classification Search
None
See application file for complete search history.

(56) References Cited

U.S. PATENT DOCUMENTS

2013/0332878 A1* 12/2013 Sung .................. H04N 1/00461
                                                              715/781
2018/0081602 A1* 3/2018 Ueda ....................... G06F 3/125

FOREIGN PATENT DOCUMENTS

JP         2014-211892 A      11/2014

* cited by examiner

*Primary Examiner* — Andrew H Lam
(74) *Attorney, Agent, or Firm* — Kenealy Vaidya LLP

(57) ABSTRACT

In an information processing device, a controller displays a database image in a first display region on a display at a first display scale. The database image represents at least partial data included in a database. The controller receives a specific operation, and displays a partial enlarged image, in a second display region on the display at a second display scale greater than the first display scale in response to reception of the specific operation. The partial enlarged image corresponds to an extraction image in a partial extraction region in the database image and is an enlarged image of the extraction image so that the partial enlarged image is displayed in the second display region at the second display scale. The second display region overlaps at most a portion of the first display region. The controller generates print data including at least partial data included in the database.

17 Claims, 11 Drawing Sheets

FIG. 2

| SITE | BUILDING | FLOOR | SPACE | RACK | PATCH PANEL | PORT | OPTION ID | |
|------|----------|-------|-------|------|-------------|------|-----------|---|
| A | BC | C | D | E | 1 | 01-12 | | ←70 |
| A | BC | F | G | H | 1 | 01-12 | | ←71 |

Row markers: ←70 (header), ←71, ←72

Column labels 80, 80 point to SITE/BUILDING area; 61, 62, 63 point to A, BC, C/F columns. 12c labels the table.

INFORMATION PROCESSING DEVICE DISPLAYING DATABASE IMAGE IN FIRST DISPLAY REGION AND PARTIAL ENLARGED IMAGE IN SECOND DISPLAY REGION

CROSS REFERENCE TO RELATED APPLICATION

This application claims priority from Japanese Patent Application No. 2021-004379 filed Jan. 14, 2021. The entire content of the priority application is incorporated herein by reference.

BACKGROUND

An information processing device known in the art is configured to transmit data to be printed to a printing device. The data to be printed is selected from a database. Accordingly, the database is preferably made easily visible to the user of the information processing device in order to facilitate the user in selecting data to be printed.

For example, a conventional portable communication terminal extracts and displays data displayed in a business form at a row and column selected by the user.

SUMMARY

The information processing device described above can extract and display a desired portion of a database, for example. However, while extracting and displaying one portion of the database can improve visibility of the extracted portion, the user cannot easily see any data other than the extracted portion.

In view of the foregoing, it is an object of the present disclosure to provide an information processing device capable of improving the visibility of a database from which data is to be extracted and printed on a printing device.

In order to attain the above and other objects, the disclosure provides a non-transitory computer readable storage medium storing a set of program instructions installed on and executed by a computer included in an information processing device capable of communicating with a printing device. The information processing device further includes a storage storing a database, and a display. The set of program instructions includes: performing a first display process to display a database image in a first display region on the display at a first display scale, the database image representing at least partial data included in the database; performing a specific reception process to receive a specific operation by the user; performing a second display process to display a partial enlarged image, in a second display region on the display at a second display scale greater than the first display scale in response to reception of the specific operation, the partial enlarged image corresponding to an extraction image in a partial extraction region in the database image and being an enlarged image of the extraction image so that the partial enlarged image is displayed in the second display region at the second display scale, the second display region overlapping at most a portion of the first display region; and performing a generation process to generate print data representing a print image to be printed by the printing device, the print image including at least partial data included in the database. According to the configurations, the user can get an overview of the database image while simultaneously viewing the partial enlarged image, thereby improving visibility of a database for printing the print image including at least partial data included in the database.

According to another aspect, the disclosure provides an information processing device. The information processing device includes a network interface, a storage, a display, and a controller. The network interface is configured to communicate with a printing device. The storage stores a database. The controller is configured to perform: a first display process to display a database image in a first display region on the display at a first display scale, the database image representing at least partial data included in the database; a specific reception process to receive a specific operation by the user; a second display process to display a partial enlarged image, in a second display region on the display at a second display scale greater than the first display scale in response to reception of the specific operation, the partial enlarged image corresponding to an extraction image in a partial extraction region in the database image and being an enlarged image of the extraction image so that the partial enlarged image is displayed in the second display region at the second display scale, the second display region overlapping at most a portion of the first display region; and a generation process to generate print data representing a print image to be printed by the printing device, the print image including at least partial data included in the database. According to the configurations, the user can get an overview of the database image while simultaneously viewing the partial enlarged image, thereby improving visibility of a database for printing the print image including at least partial data included in the database.

BRIEF DESCRIPTION OF THE DRAWINGS

The particular features and advantages of the disclosure as well as other objects will become apparent from the following description taken in connection with the accompanying drawings, in which:

FIG. 2 is an explanatory diagram illustrating an example of a database;

DETAILED DESCRIPTION

An embodiment will be described while referring to attached drawings.

1. Embodiment

(1-1) Overview of a Mobile Printing System

Figure 1:
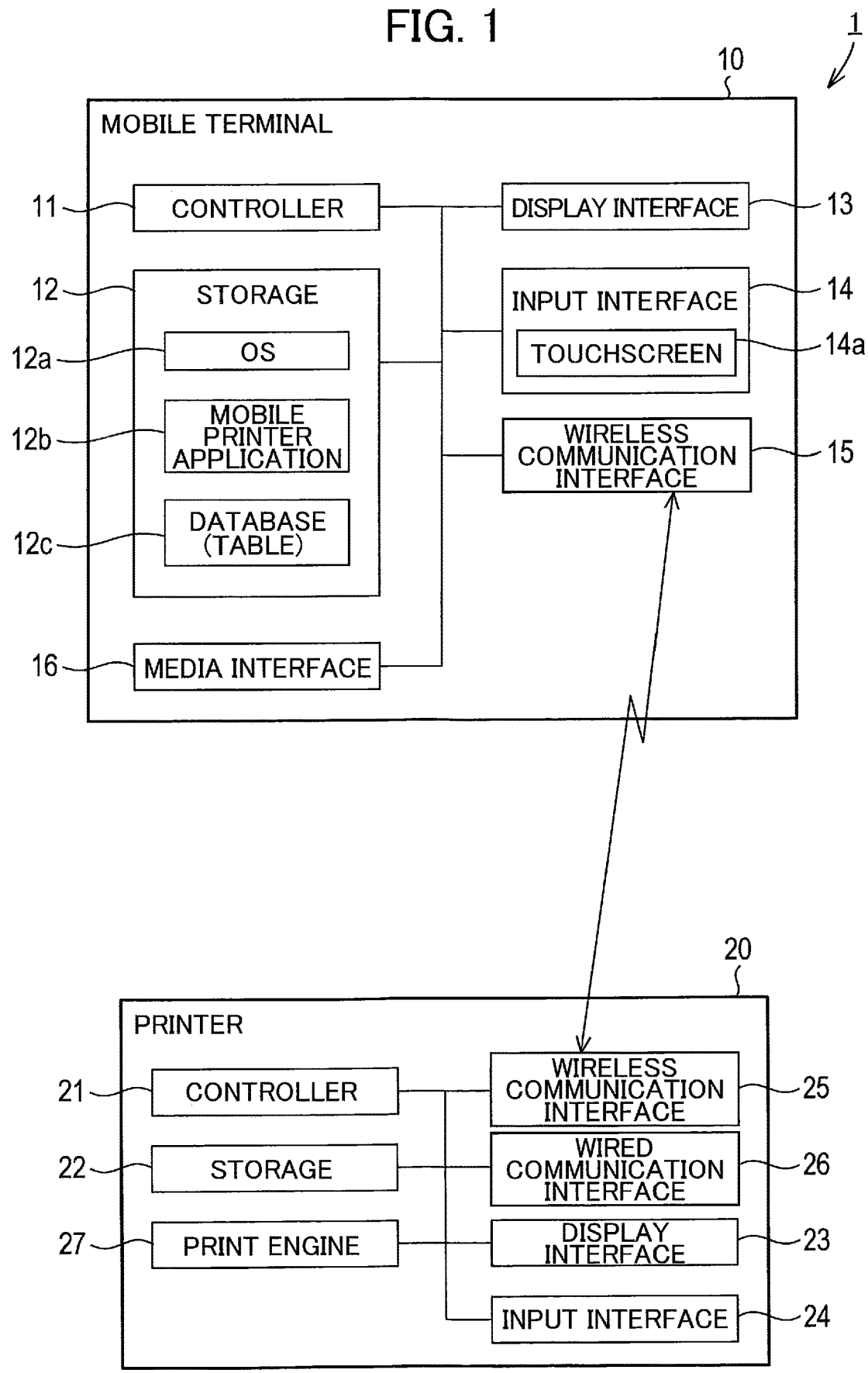
FIG. 1 is an explanatory diagram illustrating configurations of a mobile printing system.

FIG. 1 shows a mobile printing system 1 according to an embodiment. The mobile printing system 1 is provided with a mobile terminal 10, and a printer 20.

The mobile terminal 10 is an information processing device that is easily portable, such as a smartphone, a tablet computer, or a mobile personal computer. The mobile terminal 10 can communicate with the printer 20.

The printer 20 has a printing function. The printing function enables the printer 20 to print images on recording media based on print data. For example, the printer 20 may be provided in a compact portable case or may be designed to be installed and used as a stationary device.

(1-2) Configuration of the Mobile Terminal 10

As shown in FIG. 1, the mobile terminal 10 is provided with a controller 11, a storage 12, a display interface 13, an input interface 14, a wireless communication interface 15, and a media interface 16. These components are interconnected via a bus line so as to be capable of exchanging data.

The controller 11 has a CPU, for example. The storage 12 has semiconductor memory such as ROM, RAM, NVRAM, and flash memory, for example. Hence, the mobile terminal 10 according to the embodiment is provided with a microcomputer that includes a CPU and semiconductor memory.

The controller 11 implements various functions by executing programs stored in a non-transitory, tangible storage medium. In the embodiment, the storage 12 corresponds to the non-transitory, tangible storage medium storing the programs. While the various functions are implemented by the controller 11 executing programs (i.e., software processes) in the embodiment, part or all of the functions may be implemented with one or a plurality of hardware devices.

The storage 12 stores various software and data. In the embodiment, the storage 12 stores an operating system (OS) 12a and a mobile printer application 12b as the software. The mobile printer application 12b includes a program for implementing a mobile printing process described later in FIG. 8. The OS 12a and the mobile printer application 12b are installed on a computer system that includes the controller 11. The mobile printer application 12b operates based on the OS 12a. By executing the mobile printer application 12b, the controller 11 implements various functions possessed by the mobile printer application 12b.

In the following description, the action of the controller 11 (and more specifically the CPU possessed by the controller 11) executing a program will also be simply referred to by the program name. For example, the description "the mobile printer application 12b" may also be used to signify "the CPU executing the mobile printer application 12b."

The mobile printer application 12b may be installed on the mobile terminal 10 in various ways. For example, the manufacturer may install the mobile printer application 12b prior to shipping the mobile terminal 10 or the user may install the mobile printer application 12b by downloading the mobile printer application 12b from a server managed by the vendor of the printer 20.

The storage 12 also stores a database 12c. The database 12c in the embodiment includes a file in the comma-separated values (CSV) format or the Excel (registered trademark) format. Hence, the database 12c is considered a relational database or a database resembling a relational database and includes a table in the tabular form (or a business form) described in the example of FIG. 2. The database 12c may include a plurality of files (i.e., a plurality of tables). In the example of the embodiment, the database 12c includes only one file (i.e., one table).

Software capable of processing various databases displays the file included in the database 12c in tabular form. The mobile printer application 12b of the mobile terminal 10 displays the database 12c on the display interface 13 in the tabular form shown in FIG. 2. For convenience, the following description will assume that the database 12c is in the tabular format shown in FIG. 2.

As shown in FIG. 2, the database 12c includes a plurality of rows and a plurality of columns. The rows include a header 70, and a plurality of records. The records displayed in FIG. 2 are a first record 71, and a second record 72. The names of one or more categories are assigned in the row constituting the header 70. In the embodiment, the header 70 has eight categories from "Site" to "Option ID." Each of the records 71, 72, . . . is a row including data associated with each category.

The column corresponding to one category is generally referred to as a "field" or "column." The database 12c in the embodiment has a total of eight fields including a first field 61, a second field 62, and a third field 63.

Boxes at the intersections of fields and records are generally called cells. The database 12c in the embodiment has a plurality of cells 80. In the embodiment, all squares intersected by rows and columns including squares in the header 70 are referred to as cells 80. Characters can be inputted into each of the cells 80, but cells 80 with no inputted characters may also exist. In the example of the embodiment, characters are not inputted into cells 80 in the eighth column. In the example of FIG. 2, characters are inputted into all cells 80 except for cells 80 in the eighth column.

The database 12c may be stored in the storage 12 in various ways. For example, the database 12c may be read from a storage medium mounted in the media interface 16 and written to the storage 12. Alternatively, the database 12c may be acquired from another device or from the cloud via the wireless communication interface 15 and stored in the storage 12.

The mobile printer application 12b reads the database 12c and displays the database 12c on the display interface 13 in response to a user command. The mobile printer application 12b can transmit to the printer 20 print data for one or more printing targets selected by the user from the database 12c and can instruct the printer 20 to print images represented by this print data. Each of the one or more printing targets includes one or more cells 80. For example, the user may specify one or more records as printing targets to be printed on the printer 20.

The display interface 13 has a display capable of displaying images, such as, a liquid crystal display or an OLED display. The input interface 14 has an input device for receiving various input operations. The input device of the input interface 14 includes a touchscreen 14a. The touchscreen 14a can detect instruction operations (touch events or gestures) in an image displaying region of the display through contact or proximity of an indicator. When an instruction operation is performed with an indicator in the image displaying region, the touchscreen 14a outputs position information indicating the position at which the instruction operation is performed.

The controller 11 acquires position information outputted from the touchscreen 14a, and can detect at least one type of the instruction operation performed with the indicator based on this position information. Gestures, as the instruction operations, that the controller 11 can detect may include tap, flick, drag, pinch-in, and pinch-out (or spread), for example. As will be described later, the indicator may include a first finger 101 and a second finger 102 of a user's hand 100 (see FIG. 4).

The wireless communication interface 15 enables the mobile terminal 10 to communicate wirelessly with a communication device other than the mobile terminal 10 that is capable of wireless communications. The wireless communication interface 15 is provided with at least one of a function for performing wireless communications according to wireless LAN, a function for performing wireless communications according to Bluetooth (registered trademark of the Bluetooth SIG, Inc.), and a function for performing wireless communications through a mobile phone network, for example. In the embodiment, the wireless communication interface 15 has at least a function for performing wireless communications with the printer 20.

The media interface 16 accepts the insertion of various storage media, such as USB flash memory. The controller 11 controls the writing of data to and the reading of data from storage media inserted in the media interface 16.

(1-3) Structure of the Printer 20

As shown in FIG. 1, the printer 20 is provided with a controller 21, a storage 22, a display interface 23, an input interface 24, a wireless communication interface 25, a wired communication interface 26, and a print engine 27.

The controller 21 has a CPU, for example. The storage 22 has semiconductor memory, such as ROM, RAM, NVRAM, flash memory, and a solid-state drive (SSD), for example. In other words, the printer 20 is provided with a computer that includes a CPU and a semiconductor memory. The storage 22 stores various programs and data including firmware.

The display interface 23 has a liquid crystal display, an OLED display, or other display device capable of displaying images. The input interface 24 has an input device for receiving various input operations. The input interface 24 may also be provided with a touchscreen, for example.

The wireless communication interface 25 enables the printer 20 to perform wireless communication with a communication device separate from the printer 20 that is capable of wireless communication. The wireless communication interface 25 may be provided with at least one of a function for performing wireless communication according to wireless LAN, and a function for performing wireless communication according to Bluetooth, for example. In the embodiment, the wireless communication interface 25 has at least a function for performing wireless communication with the mobile terminal 10.

The wired communication interface 26 functions to perform communications with a communication device separate from the printer 20 through a cable. For example, the wired communication interface 26 may be provided with at least one of a communication function based on the wired LAN technology, a communication function based on Universal Serial Bus (USB), and a communication function for use with a serial cable.

The print engine 27 implements the printing function described above. In the embodiment, the print engine 27 is provided with a direct thermal printing mechanism, for example. However, the print engine 27 may be provided with a printing mechanism that uses a printing system other than a direct thermal system, such as a thermal transfer system, an inkjet system, or an electrophotographic system.

The printer 20 according to the embodiment is classified as a label printer, for example. The label printer has a function for printing images on a roll paper. The roll paper is a continuous recording medium wound into a roll. Roll paper comes in various types including a self-adhesive label type in which a plurality of adhesive labels is arranged at fixed intervals, a receipt type in which a continuous non-adhesive paper is wound into a roll, and a tape type in which a continuous adhesive tape is wound into a roll. For the self-adhesive label type roll paper, an image may be printed on each label. The receipt type and tape type roll paper may be cut automatically after each image is printed, for example. Alternatively, the user may cut each label manually when the label printer is not equipped with an automated cutting function.

(1-4) Functions of the Mobile Printer Application

Next, the functions of the mobile printer application 12b will be described in detail with reference to FIGS. 3 through 7. The mobile printer application 12b can generate print data based on data (for example, values) in the database 12c that has been set as a printing target. The print data represents an image that includes the data (for example, values) in the printing target. By transmitting the print data to the printer 20, the mobile printer application 12b can control the printer 20 to print the image.

The OS 12a starts up the mobile printer application 12b in response to a prescribed application start-up trigger. While not shown in the drawings, application start-up triggers may include the user tapping a start-up icon displayed in an idle screen (hereinafter called a "first start-up trigger"), for example. Application start-up triggers may also include the user performing a prescribed operation while software separate from the mobile printer application 12b is displaying the database 12c (hereinafter called a "second start-up trigger").

When started up in response to an application start-up trigger, the mobile printer application 12b displays a printer selection screen (not shown) on the display interface 13, for example. The printer selection screen enables the user to select a printing device as the destination for print data. When a printing device is selected through the printer selection screen, the mobile printer application 12b displays a paper size selection screen (not shown) on the display interface 13, for example. The paper size selection screen enables the user to select the size of roll paper to be used for printing an image. When a size for roll paper is selected through the paper size selection screen, the mobile printer application 12b displays a template selection screen (not shown) on the display interface 13, for example. The template selection screen enables the user to select a template for the image being printed.

In a case that the application start-up trigger was the first start-up trigger, and the template was selected, the mobile printer application 12b waits for the user to input a read command for the database 12c. Once the user inputs a read command for the database 12c, the mobile printer application 12b reads the database 12c and displays a main screen 3 as shown in the example of FIG. 3.

The main screen 3 has a database region 30, and a preview region 50. The database region 30 and the preview region 50 are juxtaposed vertically without overlapping each other, as illustrated in the example of FIG. 3. The main screen 3 further includes a Save button 5 and a Print button 6, as shown in FIG. 3.

A database image 60 is displayed in the database region 30 at a first display scale. Here, the term "display scale" indicates a zoom level or a magnification ratio at which an image or data represented in image data is enlarged or reduced. The database image 60 includes an image representing the database 12c read by the mobile printer application 12b. In the embodiment, the database image 60 further includes selection frames 31, 32, 33, . . . provided for each row of the database 12c. Each of the selection frames 31, 32, 33, . . . includes a corresponding one of checkboxes 31a, 32a, 33a, . . . .

Figure 3:
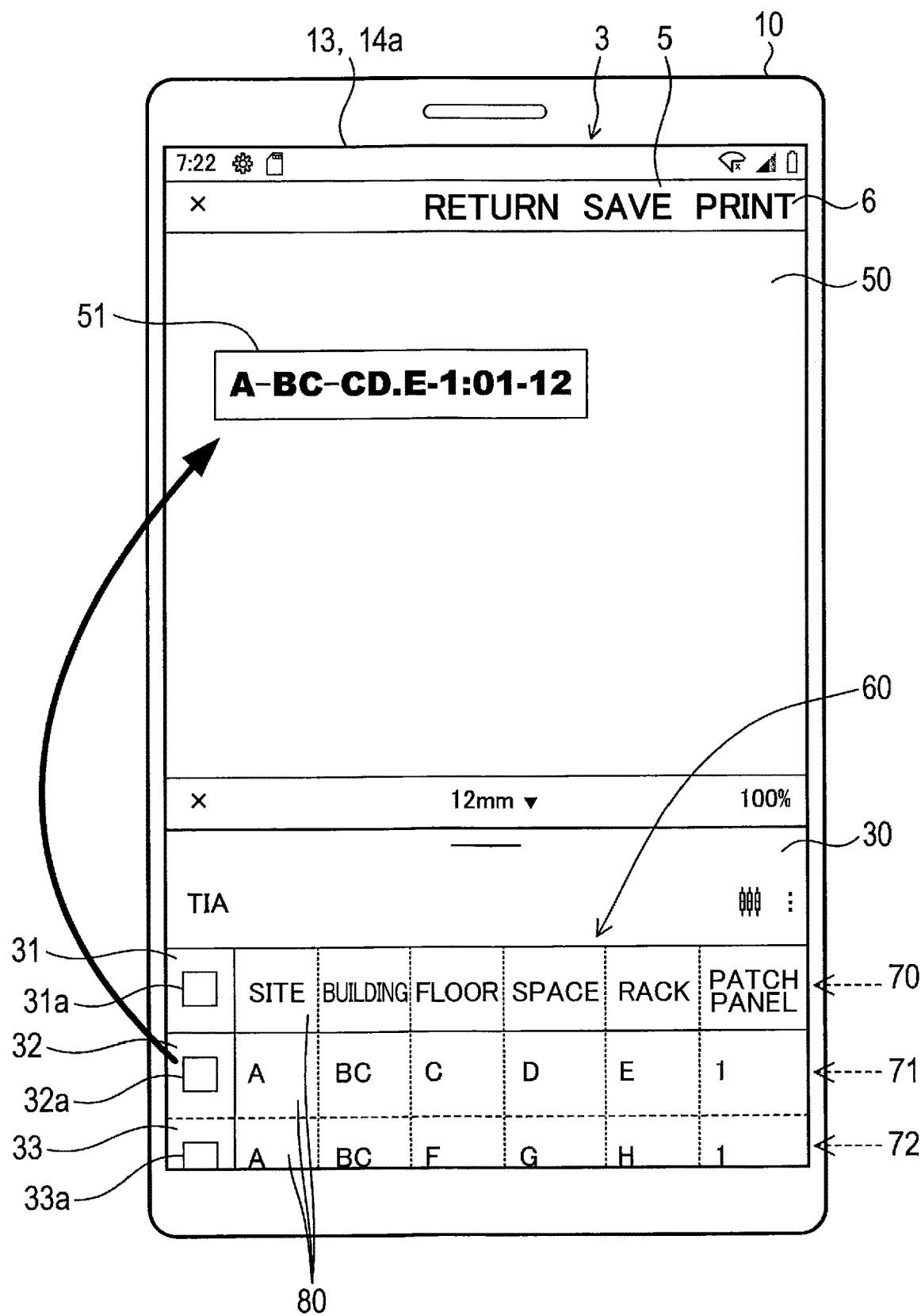
FIG. 3 is an explanatory diagram illustrating a first example of main screen.

In FIG. 3, a preview image 51 is displayed in the preview region 50. However, when the main screen 3 is first displayed in the embodiment, the preview image 51 is not included in the initial state of the preview region 50. The preview image 51 is displayed in response to a merge operation being performed, as described later.

In a case that the application start-up trigger was the second start-up trigger, the mobile printer application 12b displays the main screen 3 on the display interface 13 in response to a template being selected. Note that the order for selecting a printing device, selecting a paper size, selecting a template, and displaying the main screen 3 may be modified in any way. Further, one or more of the operations for selecting a printing device, selecting a paper size, and selecting a template may be omitted.

When a merge operation is performed in the main screen 3, the mobile printer application 12b displays in the preview region 50 a preview image 51 showing data of a merge target. A merge operation is a request for a record in the database image 60 to be displayed in (or be merged into) the preview region 50. The merge operation may be performed in any of various ways. For example, a merge operation may be an operation to drag and drop a record of the merge target, or an operation to drag and drop a selection frame corresponding to that record into the preview region 50.

The preview image 51 virtually shows the results of printing the record of the merge target on the printer 20 (i.e., the printed image). The printed image is generated based on the previously selected template. That is, each template sets the layout and the like for a background image and characters. The preview image 51 is an image of the record of the merge target that has been arranged in the selected template.

FIG. 3 shows an example of a preview image 51 conforming to a template configured as follows. With this template, characters in the first through third cells (i.e., columns) are separated from each other by hyphens "-". Characters in the third and fourth cells are not separated by symbols or the like but are arranged continuously. Characters in the fourth and fifth cells are separated by a period ".". Characters in the fifth and sixth cells are separated by a hyphen "-". Characters in the sixth and seventh cells are separated by a colon ":". Characters in the seventh and eighth cells are separated by either a hyphen "-" or an equal sign "=". A delimiter is omitted following the characters in the seventh cell in a case that no characters have been inputted into the eighth cell.

The user can enlarge, reduce, and move the database image 60 displayed in the database region 30. For example, the user can enlarge the database image 60 by performing a pinch-out gesture on the same. Note that the pinch-out gesture performed as part of a partial extraction operation described later is not considered a pinch-out gesture here.

Further, the user can reduce the size of the database image 60 by performing a pinch-in gesture on the same, for example.

Further, the user can move the database image 60 by performing a flick gesture or a drag gesture on the database image 60, for example. When the database image 60 is large due to a large quantity of data in the database 12c, the entire database image 60 cannot be displayed simultaneously at the first display scale. Thus, when only a portion of the database image 60 is displayed at one time, the user can perform a flick gesture or a drag gesture on the database image 60 to move part of the non-displayed image into the display area.

The user can also edit the characters of a cell displayed in the main screen 3. Here, the term "edit" includes at least one of the actions of inputting characters, changing the current characters to different characters, copying and pasting characters from another cell, and deleting characters.

When the user double-taps a cell in the database image 60 in the embodiment, the mobile printer application 12b sets the cell as the editing target. Thereafter, the user can edit the cell set as the editing target by performing a prescribed editing operation for the cell. In a case that the cell being edited is also included in the preview image 51, the editing results are also reflected in the preview image 51. That is, the cell displayed in the preview image 51 is modified according to the editing results.

When the user double-taps a character in the preview image 51, for example, the mobile printer application 12b sets the character as the editing target. Thereafter, the user can edit the character set as the editing target by performing a prescribed editing operation for the character. These editing results are also reflected in the database image 60 displayed in the database region 30.

When the user taps the Save button 5, the mobile printer application 12b updates the database 12c to conform with the current database image 60. For example, when the user has edited the database image 60 after the database image 60 was displayed, the mobile printer application 12b updates the current database 12c to include the edited content.

When the user taps one or more of the checkboxes 31a, 32a, 33a, . . . , a checkmark is displayed in each of the tapped checkboxes. The action of a checkmark being displayed signifies that the corresponding record has been selected as a printing target.

When the user taps the Print button 6, the mobile printer application 12b generates an individual set of print data for each record set as a printing target based on the template. Next, the mobile printer application 12b wirelessly transmits the sets of generated print data to the previously selected printing device (the printer 20, for example) via the wireless communication interface 15, whereby the printer 20 prints an image for each set of print data.

To this point, the basic functions of the mobile printer application 12b have been described, but the mobile printer application 12b in the embodiment is also provided with the following partial enlargement function. That is, when a partial extraction operation is performed on the database image 60, the mobile printer application 12b displays a pop-up window separately from the database image 60, for example. Specifically, the mobile printer application 12b displays an image corresponding to an enlargement target region, which constitutes part or all of a partial extraction region 36 (see FIG. 5) selected through the partial extraction operation, in the pop-up window as a partial enlarged image 41 (see FIG. 6).

Since the mobile terminal 10 is made small so as to be easily portable, the screen of the display interface 13 is necessarily small. Consequently, the displayed size of the database image 60 is relatively small (i.e., the first display scale), and the user may have difficulty reading characters in the cells. As described above, the user can perform a pinch-out gesture in the database image 60 in the embodiment in order to enlarge the database image 60 from the first display scale. However, enlarging the database image 60 itself increases the percentage of the database image 60 not displayed on the display interface 13. Such a display may be less user-friendly since it is difficult for the user to see an overview of the entire database image 60.

Hence, the mobile printer application 12b of the embodiment is provided with a partial enlargement function, enabling the mobile printer application 12b to display the database image 60 while simultaneously displaying the partial enlarged image 41. Next, the partial enlargement function will be described in greater detail.

The user performs the partial extraction operation when wishing to enlarge a portion of the database image 60. In the partial extraction operation, the user selects a range of the database image 60 to be enlarged. Essentially, an enlarged image of an image in the entire partial extraction region 36 (see FIG. 5) selected through the partial extraction operation is displayed as the partial enlarged image 41 in the embodiment, but an image in a portion of the partial extraction region 36 may be omitted from a target of the partial enlarged image 41, depending on the size of the partial extraction region 36.

Figure 4:
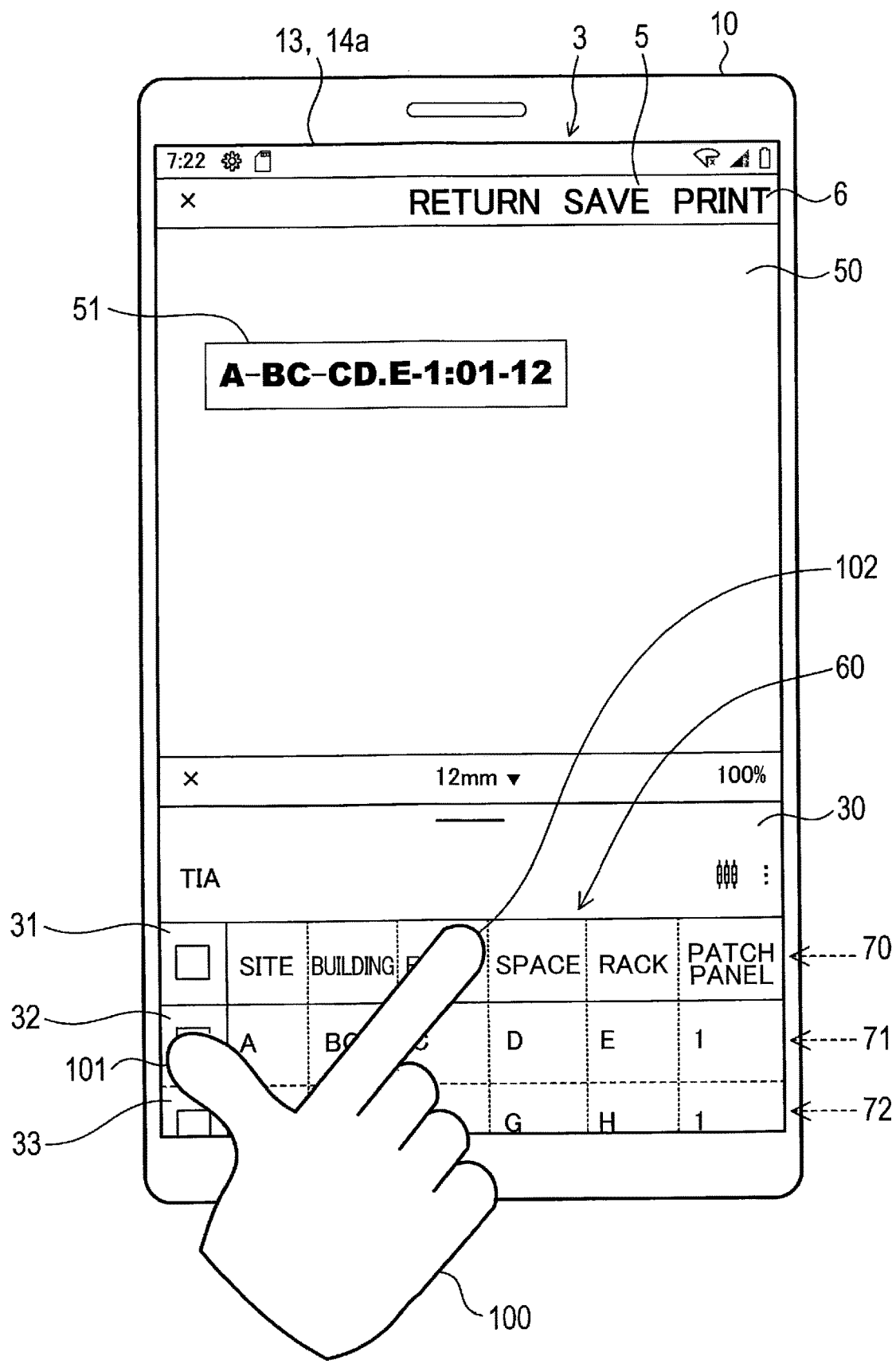
FIG. 4 is an explanatory diagram illustrating a partial extraction operation.

The partial extraction operation may include any of various operations. In the embodiment, the partial extraction operation includes a first operation and a second operation. The first operation involves the user contacting any two locations in the database image 60 with the first finger 101 (the user's thumb, for example) and the second finger 102 (the index finger, for example) continuously for a prescribed time interval. The two locations define the partial extraction region 36 having a rectangular shape. That is, the two locations indicate the positions of opposing corners in the partial extraction region 36. The example in FIG. 4 shows a case in which the user contacts the selection frame 32 in the first record 71 and the third cell of the header 70 (the cell with the text "Floor").

Figure 5:
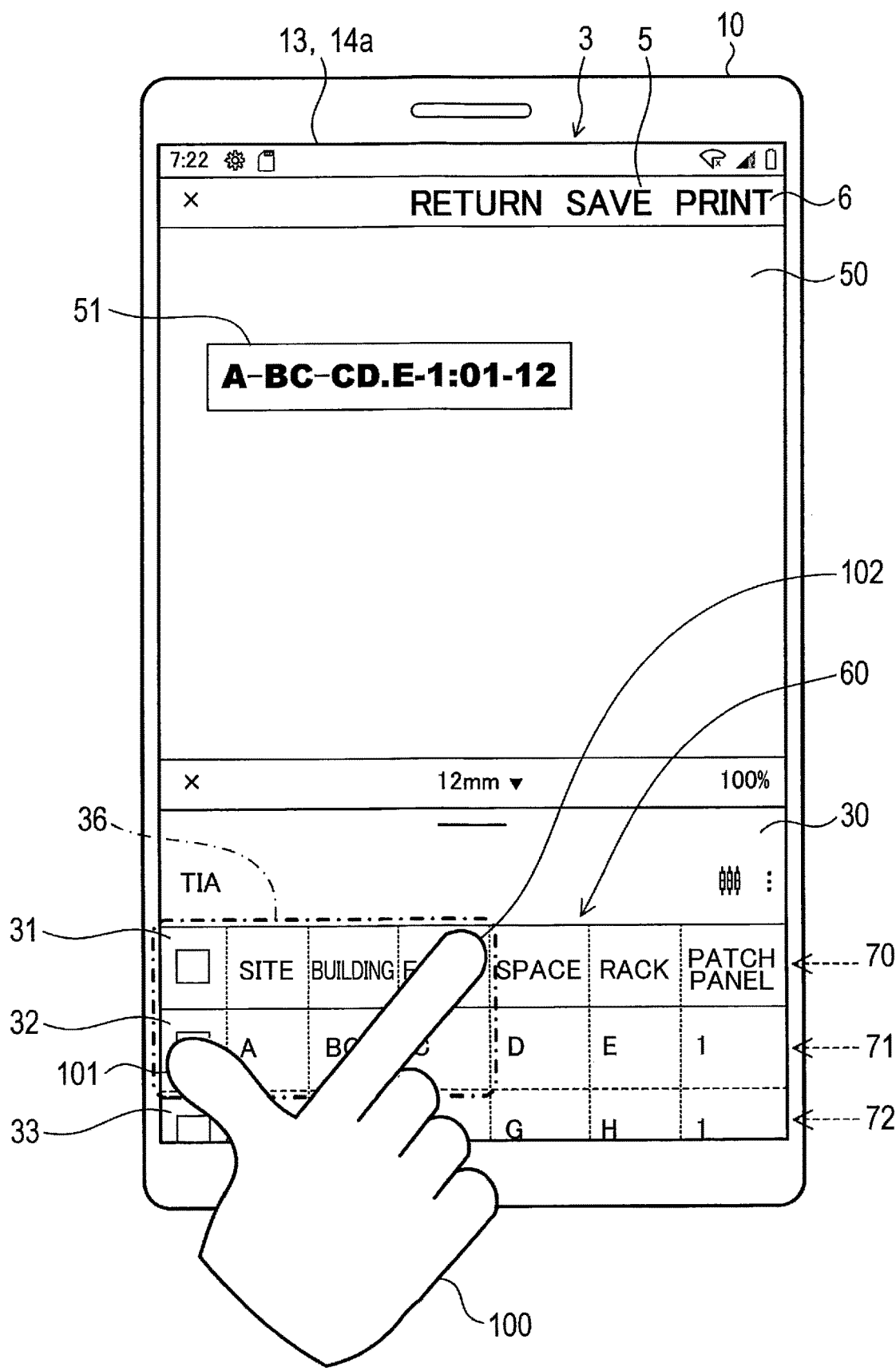
FIG. 5 is an explanatory diagram illustrating a second example of the main screen.

By performing the first operation, the user sets the partial extraction region 36 as shown in the example of FIG. 5. In the embodiment, a rectangular region having opposing corners formed by the two cells that the user contacts continuously for the prescribed time interval is set as the partial extraction region 36. Thus, the partial extraction region 36 is set in units of cells in the embodiment.

The partial extraction region 36 is displayed so as to be visually recognizable by the user. In the example of FIG. 5, the partial extraction region 36 is enclosed by a borderline (a one-dot chain line in this example). Alternatively, the partial extraction region 36 may be displayed with a different background color, pattern, or the like from the surrounding region. By performing the first operation, the user can visually recognize the partial extraction region 36.

After setting the partial extraction region 36 through the first operation, the user performs the second operation for instructing the mobile printer application 12b to initiate a process for displaying the partial enlarged image 41. The second operation may be the pinch-out gesture, for example. In other words, a pinch-out gesture performed while the partial extraction region 36 has been set through contact with the two fingers 101 and 102 (the state shown in FIG. 5) corresponds to the second operation. The partial extraction operation is completed when the user performs this second operation.

Figure 6:
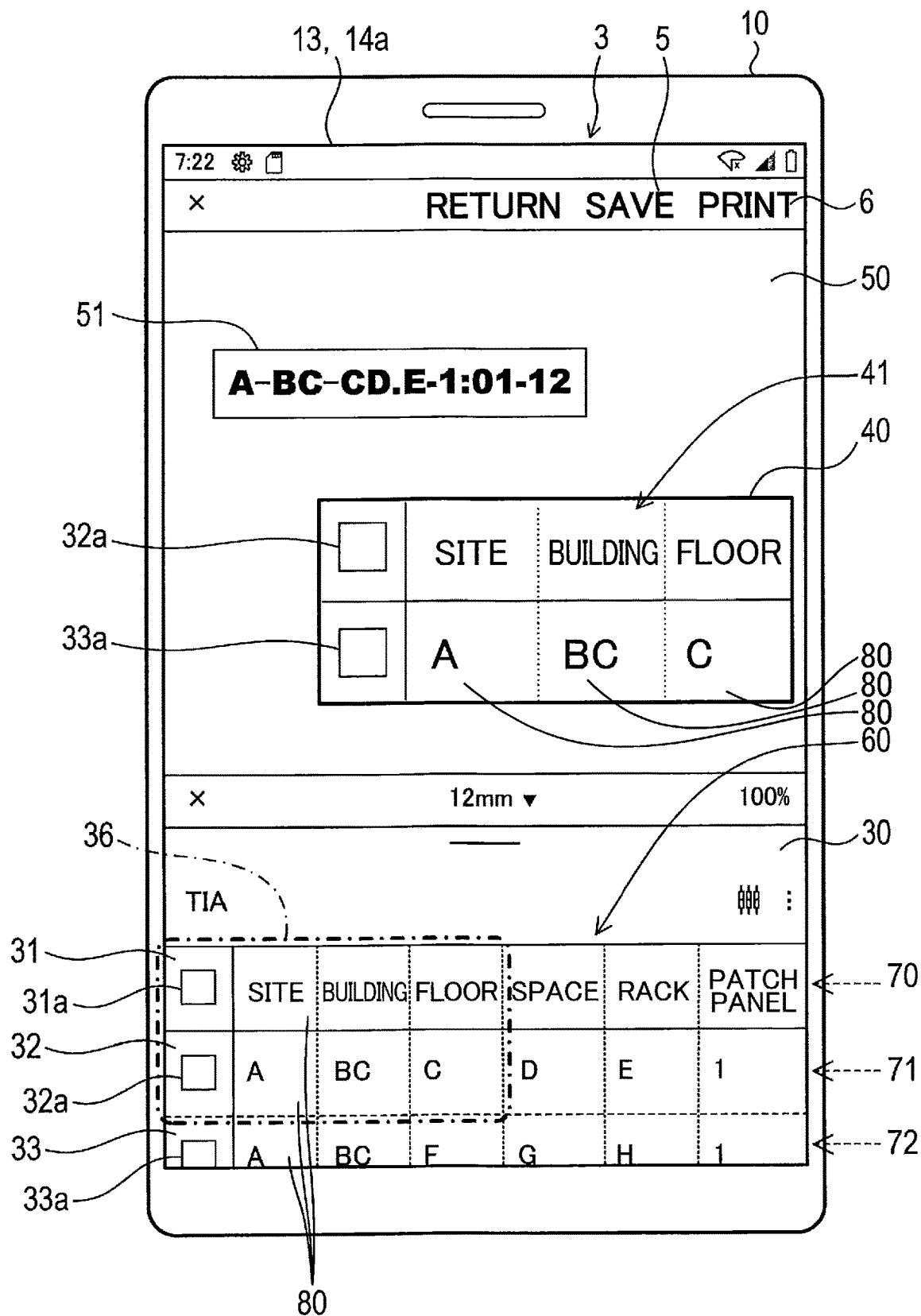
FIG. 6 is an explanatory diagram illustrating a third example of the main screen.

When the partial extraction operation is performed, the mobile printer application 12b sets all or part of the partial extraction region 36 defined by the partial extraction operation as an enlargement target region, which is to be enlarged and displayed as the partial enlarged image 41. Next, as shown in FIG. 6, the mobile printer application 12b displays the partial enlarged image 41, which corresponds to an enlarged image of an image in the set enlargement region, in a prescribed magnified display region 40 on the display interface 13 so that the partial enlarged image 41 is displayed in the magnified display region 40 at a second display scale. For example, the mobile printer application 12b performs a pop-up display to display the enlargement region on the pop-up window.

The second display scale is larger than the first display scale. In the embodiment, the second display scale is set so that the point size of characters displayed in the magnified display region 40 is greater than or equal to a lower limit (7 points, for example). In this example, 1 point corresponds to about 0.35 mm. The lower limit is set to a character size considered legible for users. For example, in a case that characters are generally legible when greater than or equal to a certain point size and not easily legible when less than the point size, that point size may be set as the lower limit. Characters displayed at the second display scale is larger than the characters displayed at the first display scale.

The second display scale may be set to a fixed value. Alternatively, the second display scale may be set variably according to the size of the partial extraction region 36 within a range that the point size of characters displayed in the magnified display region 40 do not fall below the lower limit. Hence, the second display scale may be increased for a smaller partial extraction region 36 and conversely may be decreased for a larger partial extraction region 36.

In a case that the partial extraction region 36 is large, there is a possibility that the character size will drop below the lower limit when attempting to display the entire partial extraction region 36 in the magnified display region 40. In such cases, the mobile printer application 12b excludes a portion of the partial extraction region 36 from the enlargement target region. Specifically, the mobile printer application 12b excludes a portion of the partial extraction region 36 from the enlargement target region in order to maintain the point size of characters displayed in the magnified display region 40 at or above the lower limit. Next, the mobile printer application 12b enlarges (or magnifies) in an image in the range of the partial extraction region 36 set as the enlargement target region and displays this range as the partial enlarged image 41.

In the embodiment, the magnified display region 40 is set to a predetermined fixed size. The magnified display region 40 does not overlap the database region 30 or only overlaps a portion of the database region 30. In other words, the magnified display region 40 does not cover the entire database region 30. Put another way, the magnified display region 40 overlaps at most a portion of the database region 30. In the embodiment, as shown in FIG. 6, the magnified display region 40 does not overlap the database region 30 at all.

The magnified display region 40 also either does not overlap the preview region 50 or only overlaps a portion of the preview region 50. In the embodiment, as shown in FIG. 6, the magnified display region 40 overlaps a portion of the preview region 50.

The user can edit the partial enlarged image 41 in the magnified display region 40 in various ways. When the user double-taps on a cell in the partial enlarged image 41, for example, the mobile printer application 12b in the embodiment sets the double-tapped cell as the editing target.

Thereafter, the user can perform a desired editing operation for the cell set as the editing target in order to edit the cell.

Figure 7:
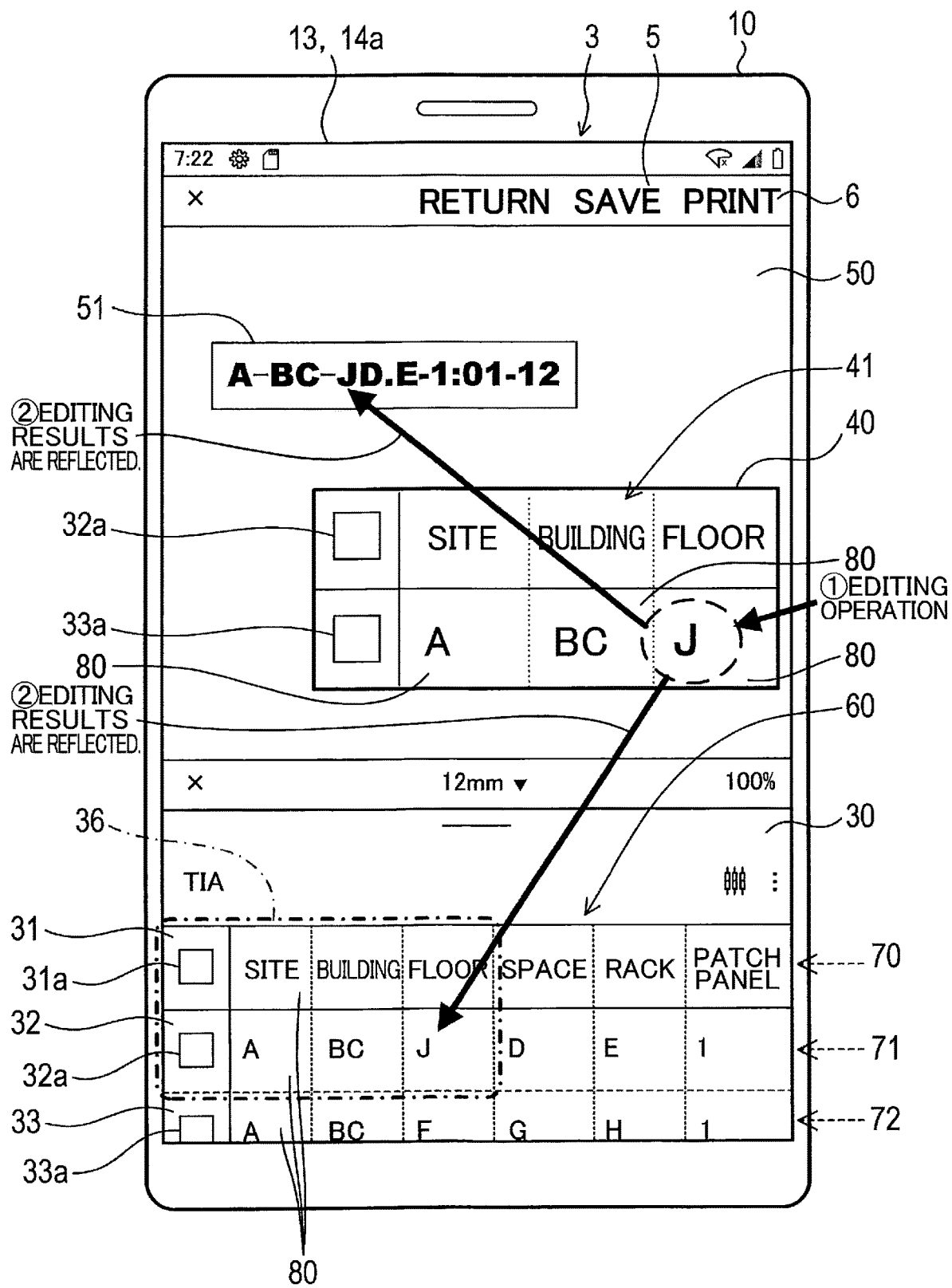
FIG. 7 is an explanatory diagram illustrating a fourth example of the main screen.

Results of editing operations in the partial enlarged image 41 are reflected in the database image 60. That is, when characters are modified in the magnified display region 40, characters in the corresponding cells of the database image 60 are similarly modified. Additionally, when the characters subjected to editing are included in the preview image 51, the editing results are also reflected in the preview image 51. FIG. 7 shows an example in which the user has performed an operation to change the character "C" in the cell 80 corresponding to the third field 63 of the first record 71 (FIG. 2) to the character "J" in the partial enlarged image 41. In the example shown in FIG. 7, the character modification in the partial enlarged image 41 is also reflected in the database image 60 and the preview image 51.

The user can enlarge, reduce, and move the partial enlarged image 41 displayed in the magnified display region 40. For example, the user can further enlarge the partial enlarged image 41 by performing a pinch-out gesture in the partial enlarged image 41 displayed at the second display scale. Conversely, the user can reduce the size of the partial enlarged image 41 by performing a pinch-in gesture in the partial enlarged image 41.

The user can also move the partial enlarged image 41 within the magnified display region 40 by performing a flick gesture or a drag gesture on the partial enlarged image 41, for example.

In a case that a record displayed in the magnified display region 40 is not currently displayed as a preview image 51, the user can display a preview image 51 of the record in the preview region 50 as follows. Specifically, the user simply taps a cell 80 of the desired record in the magnified display region 40 to display a preview image 51 for the record in the preview region 50. In a case that a preview image 51 is already displayed in the preview image 51 and a cell 80 of the desired record in the magnified display region 40 is tapped, the current preview image 51 may be updated to the new preview image 51, for example.

Conversely, in a case that a record displayed as the preview image 51 is not currently displayed in the magnified display region 40, the user can display the record that is the subject of the preview in the magnified display region 40 as follows. Specifically, the user taps the preview image 51 to display, in the magnified display region 40, a partial enlarged image 41 that includes the record in the preview image 51. More specifically, by tapping any character in the preview image 51, the user can display a partial enlarged image 41 that includes the tapped character in the magnified display region 40.

(1-5) Mobile Printing Process

Figure 8:
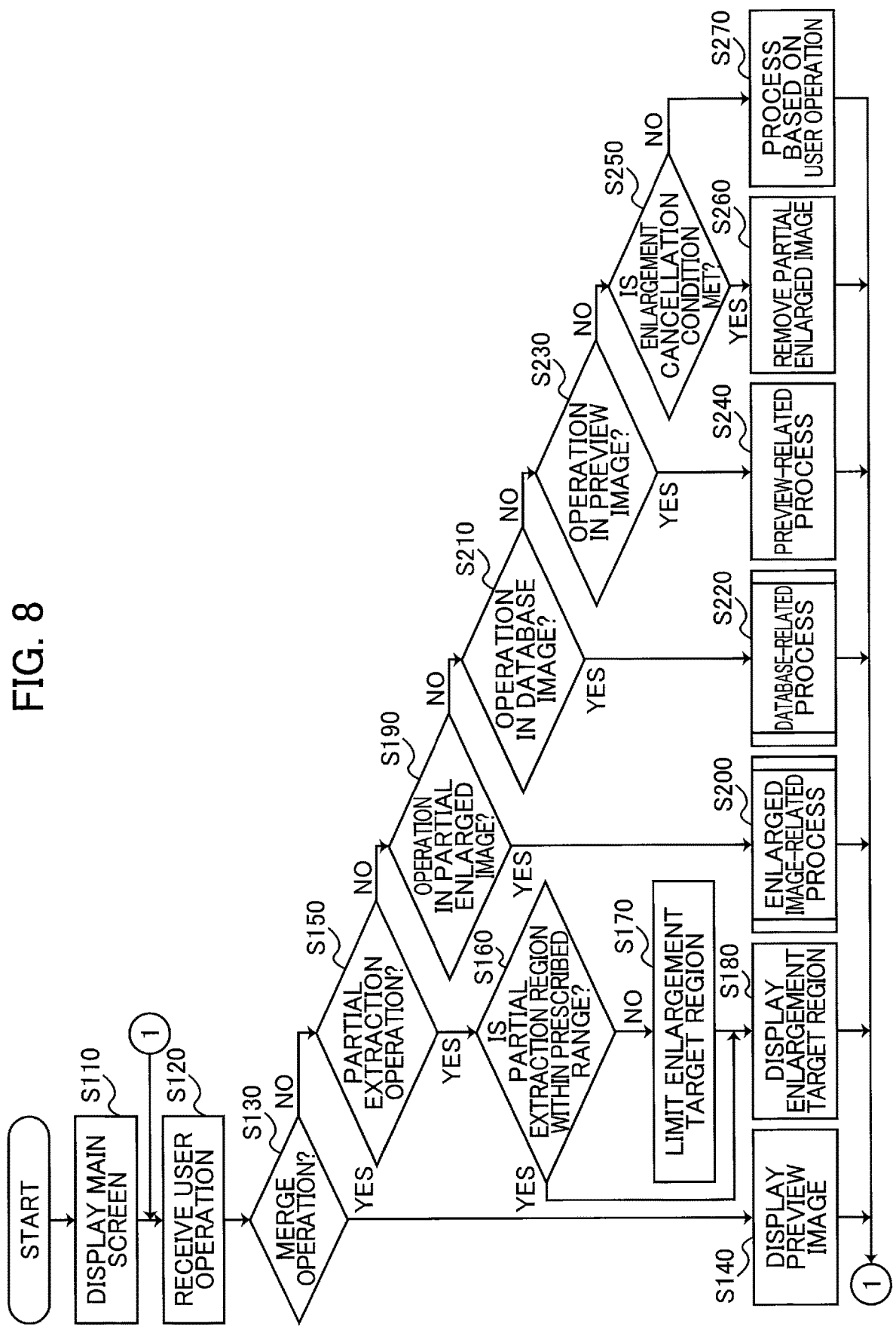
FIG. 8 is a flowchart illustrating a mobile printing process.

The controller 11 implements the various functions of the mobile printer application 12b including the partial enlargement function described above by executing a mobile printing process. FIG. 8 illustrates steps in the mobile printing process. When an application start-up trigger described above is issued, the controller 11 reads a program from the mobile printer application 12b stored in the storage 12 for implementing the mobile printing process and executes this program.

After executing prescribed processes in response to the application start-up trigger as needed at the beginning of the mobile printing process, in S110 the controller 11 displays the main screen 3. Examples of prescribed processes performed in response to the application start-up trigger include the selection of a printing device, the selection of a paper size, and the selection of a template described above in a case that the application start-up trigger is the first start-up trigger.

In S120 the controller 11 receives a user operation, and specifically a user operation performed on the touchscreen 14a. From S130 the controller 11 performs a process based on the user operation received in S120.

In S130 the controller 11 determines whether the user operation received in S120 is a merge operation for merging data from the database region 30 into the preview region 50. In a case that the user operation is a merge operation (S130: YES), in S140 the controller 11 displays a preview image 51 in the preview region 50 for the record selected in the merge operation. After completing the process in S140, the controller 11 returns to S120.

However, in a case that the controller 11 determines in S130 that the user operation is not a merge operation, in S150 the controller 11 determines whether the user operation received in S120 is a partial extraction operation performed in the database region 30. In a case that the user operation is a partial extraction operation (S150: YES), the controller 11 advances to S160.

In S160 the controller 11 determines whether the partial extraction region 36 selected through the partial extraction operation falls within a prescribed range. The prescribed range is the maximum range for which an entire image (or information) of the selected partial extraction region 3 can be displayed while characters therein can be displayed in the magnified display region 40 at a point size greater than or equal to the lower limit or a predetermined range smaller than the maximum range, for example.

In a case that the partial extraction region 36 falls within the prescribed range (S160: YES), the controller 11 advances to S180. In this case, the entire partial extraction region 36 is set as the enlargement target region.

In a case that the partial extraction region 36 does not fall within the prescribed range (S160: NO), in S170 the controller 11 limits (reduces) the enlargement target region. In other words, the controller 11 sets the enlargement target region to exclude a portion of the partial extraction region 36 in order to maintain the characters displayed in the magnified display region 40 at a point size greater than or equal to the lower limit, as described above.

In S180 the controller 11 displays the partial enlarged image 41, which corresponds to an enlarged image of an image in the set enlargement target region, in the magnified display region 40 so that the partial enlarged image is displayed at the second display scale. The display of the partial enlarged image 41 is continued after the partial extract operation is completed and the indicators (the fingers of the user) are separated from the display interface 13. After completing the process in S180, the controller 11 returns to S120.

Figure 9:
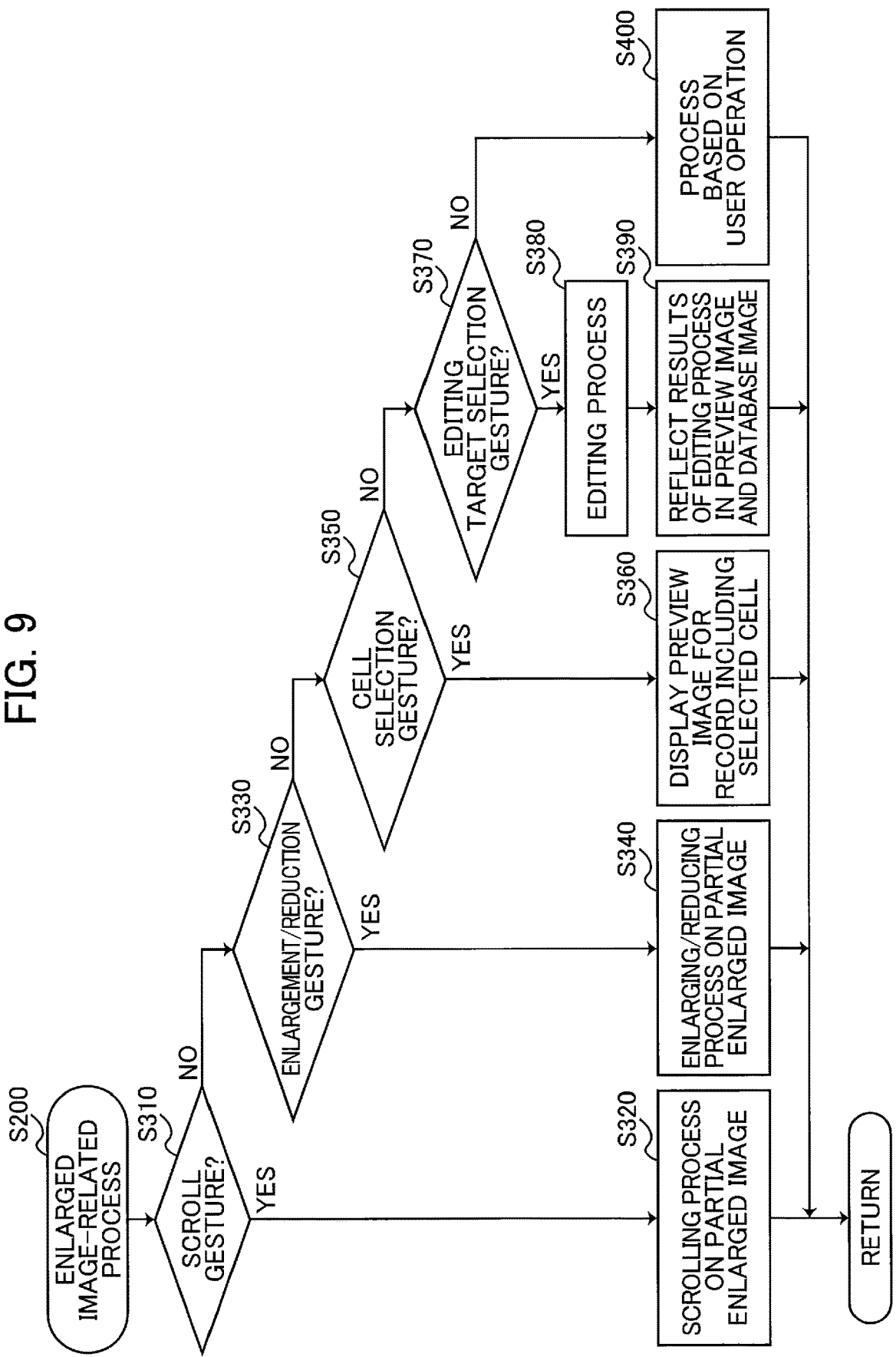
FIG. 9 is a flowchart illustrating an enlarged image-related process.

However, in a case that the controller 11 determines in S150 that the user operation is not the partial extraction operation (S150: NO), in S190 the controller 11 determines whether the user operation received in S120 is an operation performed in the partial enlarged image 41. In a case that the controller 11 determines that the user operation is an operation in the partial enlarged image 41 (S190: YES), in S200 the controller 11 executes an enlarged image-related process. FIG. 9 shows steps in the enlarged image-related process.

In S310 at the beginning of the enlarged image-related process in FIG. 9, the controller 11 determines whether the user operation is a scroll gesture. A scroll gesture is an operation instructing the controller 11 to scroll the partial enlarged image 41 inside the magnified display region 40. The scroll gesture may include the drag gesture and the flick gesture described above, for example.

In a case that the controller 11 determines in S310 that the user operation is a scroll gesture (S310: YES), in S320 the controller 11 performs a scrolling process on the partial enlarged image 41. In other words, the controller 11 scrolls the partial enlarged image 41 within the magnified display region 40. Subsequently, the controller 11 returns to S120 of FIG. 8.

However, in a case that the controller 11 determines in S310 that the user operation is not a scroll gesture (S310: NO), in S330 the controller 11 determines whether the user operation is an enlargement/reduction gesture. The enlargement/reduction gesture is an operation instructing the controller 11 to enlarge or reduce the size of the partial enlarged image 41 in the magnified display region 40. The enlargement/reduction gesture includes the pinch-in gesture and pinch-out gesture described above, for example.

In a case that the user operation is the enlargement/reduction gesture (S330: YES), in S340 the controller 11 performs an enlarging/reducing process on the partial enlarged image 41. That is, the controller 11 enlarges or reduces the partial enlarged image 41 in the magnified display region 40 in accordance with the user operation. After completing the process in S340, the controller 11 returns to S120 of FIG. 8.

However, in a case that the controller 11 determines in S330 that the user operation is not the enlargement/reduction gesture (S330: NO), in S350 the controller 11 determines whether the user operation is a cell selection gesture. The cell selection gesture is an operation for selecting a cell in the partial enlarged image 41. The cell selection gesture includes the tapping gesture described above, for example.

In a case that the user operation is the cell selection gesture (S350: YES), in S360 the controller 11 displays a preview image 51 for the record that includes the selected cell in the preview region 50. In a case that a preview image 51 is already displayed in the preview image 51, in S360 the controller 11 may updates the current preview image 51 so that the updated preview image 51 represents the record of the selected cell. After completing the process in S360, the controller 11 returns to S120 of FIG. 8.

However, in a case that the controller 11 determines in S350 that the user operation is not a cell selection gesture (S350: NO), in S370 the controller 11 determines whether the user operation is an editing target selection gesture. The editing target selection gesture is an operation for selecting a cell to be the editing target. The editing target selection gesture includes the double-tapping gesture described above, for example.

In a case that the user operation is the editing target selection gesture (S370: YES), in S380 the controller 11 executes an editing process. Specifically, the controller 11 receives the editing operation performed by the user and edits the target cell based on the editing operation. In S390 the controller 11 reflects the results of the editing process in the preview image 51 and the database image 60. After completing the process in S390, the controller 11 returns to S120 of FIG. 8.

However, in a case that the controller 11 determines in S370 that the user operation is not an editing target selection gesture (S370: NO), the controller 11 advances to S400. Advancing to step S400 signifies that the user operation in the magnified display region 40 is a different operation from the scroll gesture, the enlargement/reduction gesture, the cell selection gesture, and the editing target selection gesture. In S400 the controller 11 executes a process based on this user operation. User operations that would result in the controller 11 advancing to S400 include a selection operation for a checkbox in a case that a checkbox is displayed in the magnified display region 40, for example. The checkbox selection operation includes a tapping gesture, for example. The checkbox selection operation signifies an operation to select the record associated with the checkbox. When an operation is performed to select a checkbox in the magnified display region 40, the controller 11 displays a checkmark in the checkbox while simultaneously displaying a checkmark in the corresponding checkbox of the database image 60. Next, the controller 11 sets the record corresponding to that checkbox as the printing target. After completing the process in S40, the controller 11 returns to S120 in FIG. 8.

Here, the description will return to S190 in FIG. 8. In a case that the controller 11 determines in S190 that the user operation is not an operation in the partial enlarged image 41 (S190: NO), in S210 the controller 11 determines whether the user operation is an operation in the database image 60.

Figure 10:
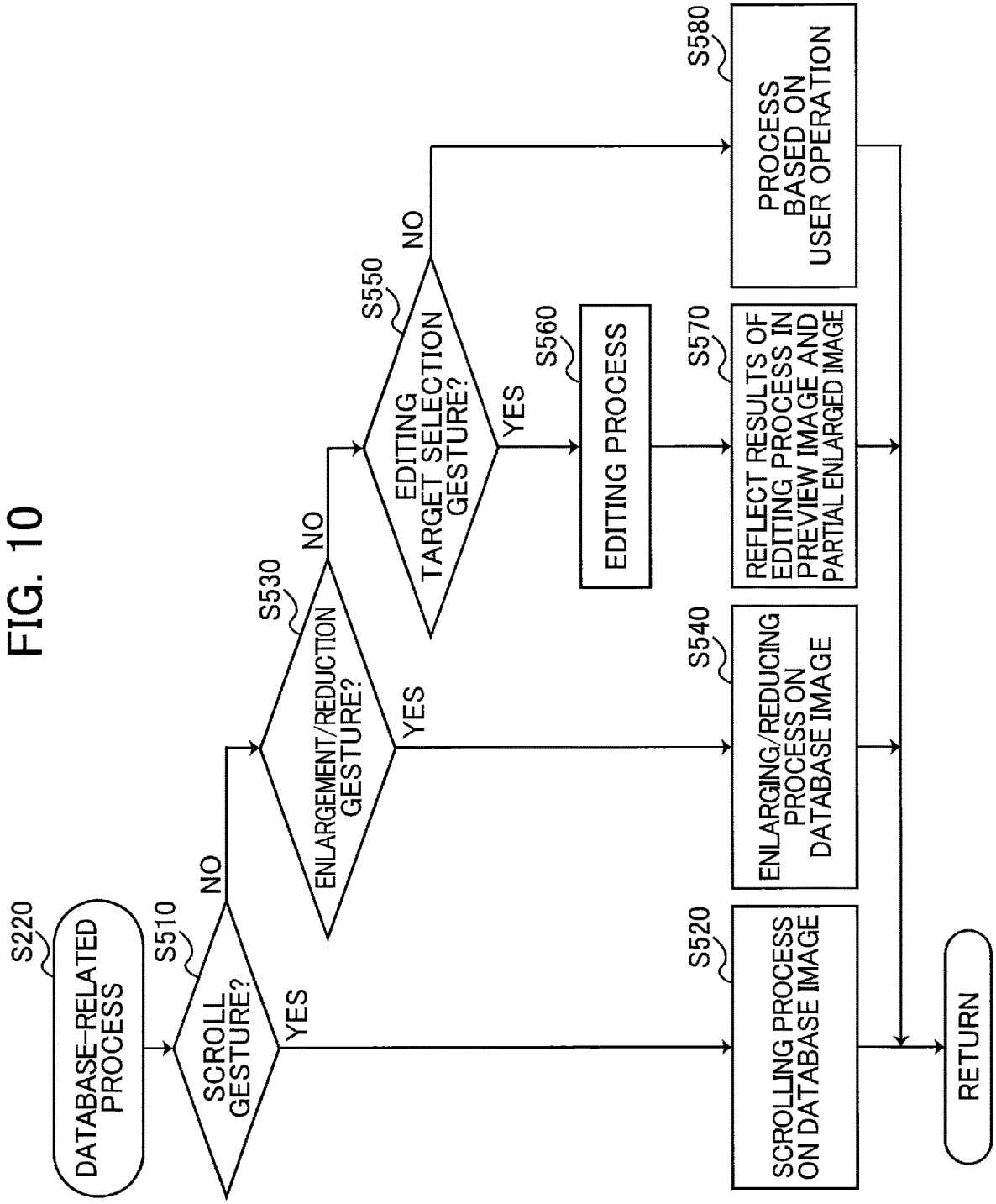
FIG. 10 is a flowchart illustrating a database-related process.

In a case that the user operation is the operation in the database image 60 (S210: YES), in S220 the controller 11 executes a database-related process. FIG. 10 shows steps in the database-related process.

In S510 at the beginning of the database-related process in FIG. 10, the controller 11 determines whether the user operation is a scroll gesture. The scroll gesture in S510 is an operation instructing the controller 11 to scroll the database image 60 within the database region 30. The scroll gesture includes the drag gesture and the flick gesture described above, for example.

In a case that the controller 11 determines in S510 that the user operation is a scroll gesture (S510: YES), in S520 the controller 11 performs a scrolling process for the database image 60. That is, the controller 11 scrolls the database image 60 within the database region 30. After completing the process of S520, the controller 11 returns to S120 of FIG. 8.

However, in a case that the controller 11 determines in S510 that the user operation is not a scroll gesture (S510: NO), in S530 the controller 11 determines whether the user operation is an enlargement/reduction gesture. The enlargement/reduction gesture in S530 is an operation instructing the controller 11 to enlarge or reduce the size of the database image 60 inside the database region 30. The enlargement/reduction gesture includes the pinch-in gesture and pinch-out gesture described above, for example.

In a case that the controller 11 determines in S530 that the user operation is the enlargement/reduction gesture (S530: YES), in S540 the controller 11 performs an enlarging/reducing process on the database image 60. That is, the controller 11 enlarges or reduces the database image 60 inside the database region 30 in conformance with the user operation. After completing the process in S540, the controller 11 returns to S120 of FIG. 8.

However, in a case that the controller 11 determines in S530 that the user operation is not an enlargement/reduction gesture (S530: NO), in S550 the controller 11 determines whether the user operation is an editing target selection gesture. The editing target selection gesture in S550 is an operation for selecting a cell in the database image 60 to be edited. The editing target selection gesture includes the double-tapping gesture described above, for example.

In a case that the controller 11 determines in S550 that the user operation is the editing target selection gesture to select a target cell to be edited in the database image 60 (S550:

YES), in S560 the controller 11 executes an editing process. Specifically, the controller 11 receives an editing operation performed by the user and edits the target cell in the database image 60 based on the editing operation. In S570 the controller 11 reflects the results of the editing process in S560 in the preview image 51 and the partial enlarged image 41. After completing the process of S570, the controller 11 returns to S120 in FIG. 8.

However, in a case that the controller 11 determines in S550 that the user operation is not the editing target selection gesture (S550: NO), the controller 11 advances to S580. Advancing to S580 signifies that the user operation in the database image 60 is a different operation from the scroll gesture, the enlargement/reduction gesture, and the editing target selection gesture. In S580 the controller 11 executes a process based on this user operation. A user operation that results in the controller 11 advancing to S580 includes an operation to select a checkbox displayed in the database region 30, for example. When a selection operation is performed on a checkbox in the database region 30, the controller 11 displays a checkmark in that checkbox and, in a case that a corresponding checkbox is displayed in the magnified display region 40, the controller 11 displays a checkmark in that checkbox as well. Next, the controller 11 sets the record associated with the checkbox as the printing target. After completing the process in S580, the controller 11 returns to S120 in FIG. 8.

Returning to FIG. 8, in a case that the controller 11 determines in S210 that the user operation is not an operation in the database image 60 (S210: NO), in S230 the controller 11 determines whether the user operation is a preview image operation. The preview image operation is an operation in the preview image 51 and includes a tapping gesture. For example, in the preview image operation, the user may tap a character in the preview image 51 ((i.e., an image corresponding to data).

In a case that the controller 11 determines in S230 that the user operation is the preview image operation (S230: YES), in S240 the controller 11 executes a preview-related process. Specifically, the controller 11 displays a partial enlarged image 41 that includes the record that is the target of the preview in the magnified display region 40. After completing the process of S240, the controller 11 returns to S120.

However, in a case that the controller 11 determines in S230 that the user operation is not the preview image operation (S230: NO), in S250 the controller 11 determines whether an enlargement cancellation condition is met. The enlargement cancellation condition is a condition for removing the partial enlarged image 41 displayed in the magnified display region 40. This enlargement cancellation condition may be met in any of various ways. In the embodiment, the condition is met when a specific enlargement cancellation operation is performed. This specific enlargement cancellation operation may be any type of operation, such as continuous contact with the magnified display region 40 for a prescribed time or greater.

In a case that the controller 11 determines in S250 that the enlargement cancellation condition is met (S250: YES), in S260 the controller 11 removes the partial enlarged image 41. After completing the process of S260, the controller 11 returns to S120.

However, in a case that the controller 11 determines in S250 that the enlargement cancellation condition is not met (S250: NO), in S270 the controller 11 executes a process based on the user operation. User operations that may lead to step S270 include an operation on the Save button 5 or the Print button 6, for example. In a case that the controller 11 has advanced to S270 because the user operated the Print button 6, in S270 the controller 11 generates print data for the record set as the printing target and transmits this print data to the printer 20, as described above. After completing the process in S270, the controller 11 returns to S120.

(1-6) Effects of the Embodiment

The embodiment described above obtains the following effects (1a)-(1h).

(1a) When the partial extraction operation is received, the mobile printer application 12b displays the partial enlarged image 41 in the magnified display region 40 while partially or entirely maintaining the display of the database image 60 in the database region 30. The magnified display region 40 either overlaps a portion of the database region 30 or does not overlap any of the database region 30. The partial enlarged image 41 is displayed at the second display scale. The second display scale is a larger scale than the first display scale at which the database image 60 is displayed.

Through this display, the user can get an overview of the database image 60 in the database region 30 while simultaneously viewing an enlarged image in the magnified display region 40 at a larger size. Here, the enlarged image corresponds to an image in the enlargement target region of the database image 60. Accordingly, this display can improve visibility of a database for printing portions of the database on the printer 20.

(1b) The database 12c according to the embodiment includes a table, i.e., a plurality of cells displayed in a tabular form. By performing a partial extraction operation to extract a section of the table in units of cells, the user can set the partial extraction region 36 to a section of cells. Therefore, the user can easily select a desired region to enlarge.

(1c) The second display scale is set so that characters displayed in the magnified display region 40 have a point size greater than or equal to the lower limit Thus, the partial enlarged image 41 is displayed at a display scale capable of maintaining the point size of characters in the cells greater than or equal to the lower limit, irrespective of the size of the partial extraction region 36 selected by the user. Accordingly, good visibility of characters in the magnified display region 40 can be maintained.

(1d) The user can perform an editing operation on a cell enlarged in the magnified display region 40. Moreover, results of editing the cell in the magnified display region 40 are reflected in each of the database image 60 and the preview image 51. Accordingly, the user can easily and efficiently edit the database 12c.

(1e) By performing an operation on a checkbox in the magnified display region 40, the user can set the associated record as a printing target. Hence, the user can easily set a record to be printed through an operation in the magnified display region 40.

(1f) When a cell displayed in the magnified display region 40 is selected through a user operation, a preview image 51 for the record that includes the selected cell is displayed in the preview region 50. Accordingly, the user can easily display a preview image 51 for a desired record through an operation in the magnified display region 40.

(1g) When a character in the preview image 51 (i.e., an image corresponding to data) is selected through a user operation, a partial enlarged image 41 that includes the selected character is displayed in the magnified display region 40. Accordingly, the user can easily display, in the magnified display region 40, an enlarged image of desired data which is displayed in the preview image 51.

(1h) The magnified display region 40 does not overlap the preview image 51 in the embodiment. Hence, the user can visually compare the partial enlarged image 41 and the preview image 51 easily and efficiently.

In the embodiment, the printer 20 is an example of a printing device. The mobile terminal 10 is an example of an information processing device. The mobile printer application 12b is an example of a program. The display interface 13 is an example of a display. The wireless communication interface 15 is an example of a communication interface. The database region 30 is an example of a first display region. The magnified display region 40 is an example of a second display region. The preview region 50 is an example of a third display region. The partial extraction region 36 is an example of a specific region. The partial extraction operation is an example of a specific operation.

The process of S110 is an example of a first display process. The process of S150 is an example of a specific reception process. The processes of S180 and S240 are examples of a second display process. The process of S270 is an example of a generation process. The process of S120 is an example of the specific reception process. The process of S370 is an example of an editing reception process. The process of S390 is an example of a reflection process. The process of S400 is an example of a designation reception process and a setting process. The process of S130 is an example of a preview setting process. The processes of S140 and S360 are examples of a third display process. The process of S350 is an example of a cell selection process. The process of S230 is an example of a data selection process. The process of S260 is an example of a removing process.

2. Other Embodiments

While the disclosure has been described in detail with reference to the specific embodiment thereof, it would be apparent to those skilled in the art that various changes and modifications may be made therein without departing from the scope of the invention.

Figure 11:
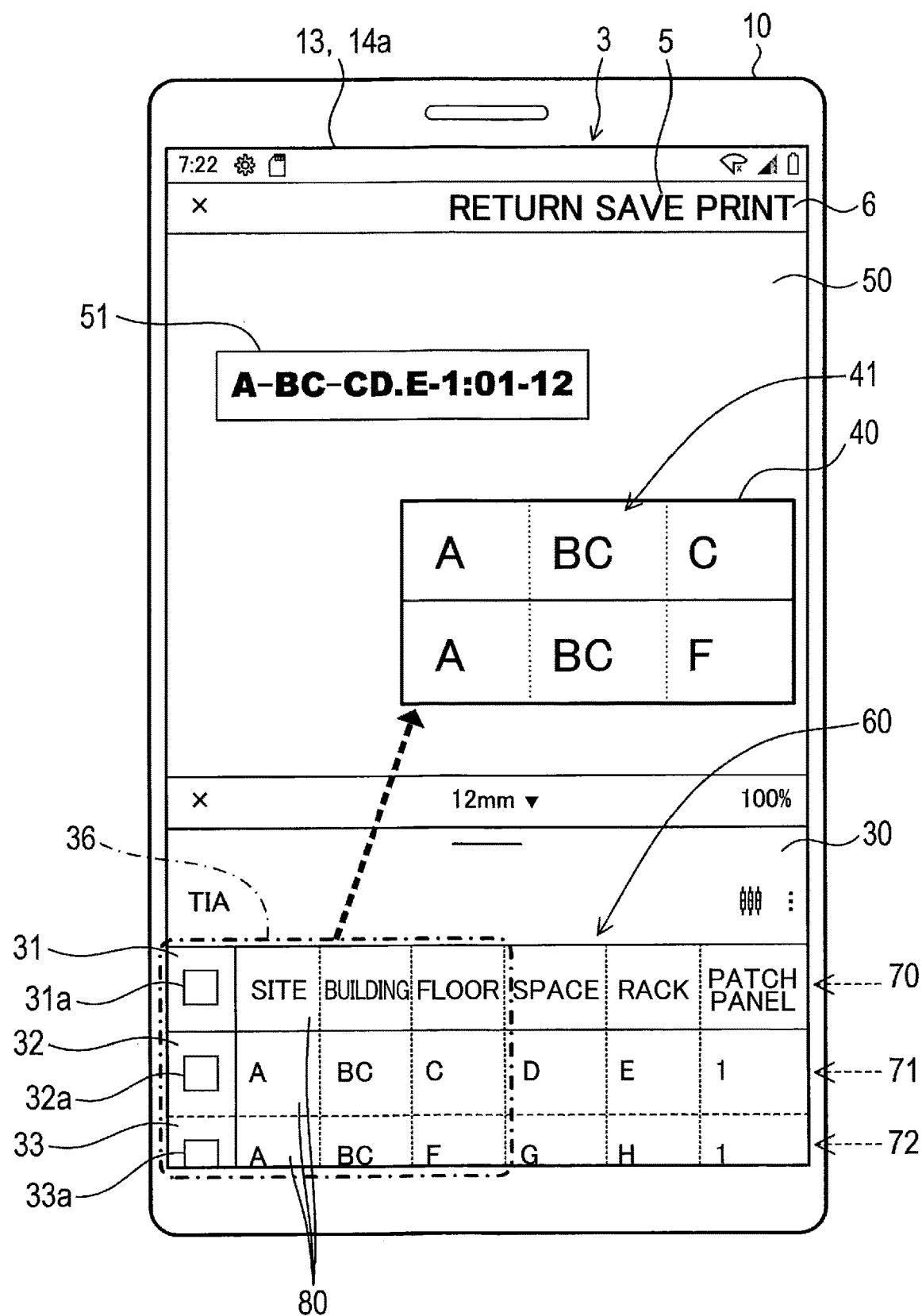
FIG. 11 is an explanatory diagram illustrating an example of the main screen.

(2-1) An option to include or not include the header 70 in the partial enlarged image 41 may be predetermined irrespective of whether the header 70 is included in the partial extraction region 36 extracted from the database image 60 through a user operation. For example, a partial enlarged image 41 that includes the header 70 may be displayed in the magnified display region 40 even when the header 70 is not included in the partial extraction region 36. Conversely, a partial enlarged image 41 that excludes the header 70 may be displayed in the magnified display region 40 even though the header 70 is included in the partial extraction region 36, as in the example shown in FIG. 11.

Further, both the header 70 and the checkboxes may be configured to be non-selectable in the partial extraction region 36. Alternatively, the header 70 and checkboxes may be automatically displayed in the magnified display region 40 regardless of whether the header 70 and the checkboxes are selectable or not in the partial extraction region 36.

The image of the database in the present disclosure is not limited to the database image 60 in the embodiment described above. At least a portion of the data included in the database may be represented in any form in the database image. Specifically, at least a portion of data in the database may be displayed in any layout in the database image and in any font or color and may include any type of decorative elements (such as ruled lines).

(2-2) The magnified display region 40 need not be set to a fixed size. That is, the user may be allowed to perform operations to enlarge or reduce the size of the magnified display region 40 itself. In this case, the partial enlarged image 41 displayed in the magnified display region 40 may also be enlarged and reduced in accordance with enlarging and reducing of the magnified display region 40. Alternatively, the display scale of the partial enlarged image 41 may be kept constant as the magnified display region 40 is enlarged or reduced in size.

(2-3) The enlargement cancellation condition may be met when contact on the touchscreen 14a with the user's hand 100 is removed after display of a partial enlarged image 41 in the magnified display region 40 was started through a user's partial extraction operation, for example. This configuration requires the user to maintain contact on the touchscreen 14a with the hand 100 after performing the partial extraction operation in order to continue displaying the partial enlarged image 41, but facilitates removal of the partial enlarged image 41.

(2-4) The magnified display region 40 may be set so as not to overlap either of the database region 30 and the preview region 50. For example, the entire image displaying region of the display interface 13 may be divided into three sections having the database region 30, the magnified display region 40, and the preview region 50.

(2-5) The preview region 50 need not be included in the main screen 3 initially. For example, the initial main screen 3 may include the database region 30 alone, and the preview region 50 may be displayed when the user performs a prescribed operation for displaying the preview region 50.

(2-6) The technique described in the present disclosure can be applied to various devices other than the mobile terminal 10 and to other printing devices other than the printer 20.

(2-7) A plurality of functions possessed by a single component in the embodiment described above may be implemented by a plurality of components, and a single function possessed by a single component may be implemented by a plurality of components. Similarly, a plurality of functions possessed by a plurality of components may be implemented by a single component, and a single function implemented by a plurality of components may be implemented by a single component. Additionally, some of the structures in the embodiment may be omitted. Further, at least some of the structures in the embodiment may be added to or used in place of structures in the other embodiments.

What is claimed is:

1. A non-transitory computer readable storage medium storing a set of program instructions installed on and executed by a computer included in an information processing device capable of communicating with a printing device, the information processing device further including a storage storing a database, and a display, the set of program instructions comprising:

performing a first display process to display a database image in a first display region on the display at a first display scale, the database image representing at least partial data included in the database;

performing a specific reception process to receive a specific operation by the user;

performing a second display process to display a partial enlarged image, in a second display region on the display at a second display scale greater than the first display scale in response to reception of the specific operation, the partial enlarged image corresponding to an extraction image in a partial extraction region in the database image and being an enlarged image of the extraction image so that the partial enlarged image is displayed in the second display region at the second display scale, the second display region overlapping at most a portion of the first display region; and performing a generation process to generate print data representing a print image to be printed by the printing device, the print image including at least partial data included in the database.

2. The non-transitory computer readable storage medium according to claim 1, wherein the database image includes a table, the table including a plurality of cells arranging in a tabular form, wherein the specific operation includes a selection operation to select a specific region in the table, the specific region including at least one cell among the plurality of cells, wherein the second display process sets the partial extraction region to all or a part of the specific region so that the partial enlarged image can be displayed in the second display region at the second display scale.

3. The non-transitory computer readable storage medium according to claim 2, wherein the specific operation includes:

a first operation in which two indicators contact two locations in the database image displayed in the first display region continuously in a prescribed time interval according to a user operation, the two locations defining the specific region; and a second operation which is a pinch-out operation to spread the two locations specified in the first operation.

4. The non-transitory computer readable storage medium according to claim 2, wherein the plurality of cells includes a cell in which a character is inputted, wherein the second display scale is set so that a point size of a character displayed in the second display region is greater than or equal to a prescribed lower limit.

5. The non-transitory computer readable storage medium according to claim 2, wherein the set of program instructions further comprises:

performing an editing reception process to receive an editing operation for a target cell displayed in the second display region;

performing an editing process to edit the target cell according to the editing operation; and performing a reflecting process to reflect a result of the editing process in a cell which is displayed in the first display region and corresponds to the target cell displayed in the second display region.

6. The non-transitory computer readable storage medium according to claim 2, wherein the table includes a plurality of rows, the plurality of rows including a header and a record, the header including a plurality of cells being assigned with respective ones of a plurality of category names, the record including a plurality of sets of data being assigned with respective ones of the plurality of category names, wherein the second display process displays the partial enlarged image including one or more cells in the header even in a case that the specific region selected through the specific operation excludes any cell in the header.

7. The non-transitory computer readable storage medium according to claim 2, wherein the table includes a plurality of rows, the plurality of rows including a header and a record, the header including a plurality of cells being assigned with respective ones of a plurality of category names, the record including a plurality of sets of data being assigned with respective ones of the plurality of category names, wherein the second display process displays the partial enlarged image excluding any cell in the header even in a case that the specific region selected through the specific operation includes one or more cells in the header.

8. The non-transitory computer readable storage medium according to claim 6, wherein the set of program instructions further comprises:

performing a designation reception process to receive a designation of a record displayed in the second display region; and performing a setting process to set the designated record as a target of the generation process.

9. The non-transitory computer readable storage medium according to claim 1, wherein the set of program instructions further comprises:

performing a preview setting process to set a preview target from the database; and performing a third display process to display a preview image in a third display region on the display, the preview image virtually showing a result of printing the preview target.

10. The non-transitory computer readable storage medium according to claim 2, wherein the set of program instructions further comprises:

performing a cell selection process to receive a cell selection operation to select a cell displayed in the second display region; and performing a third display process to display a preview image in a third display region on the display in response to reception of the cell selection operation, the preview image virtually showing a result of printing data corresponding to the cell selected in the cell selection process.

11. The non-transitory computer readable storage medium according to claim 9, wherein the set of program instructions further comprises:

performing a data selection process to receive a data selection operation to select, from the preview image displayed in the third display region, an image corresponding to data included in the database, wherein in response to reception of the data selection operation, the second display process displays the partial enlarged image including the data corresponding to the image selected in the data selection operation.

12. The non-transitory computer readable storage medium according to claim 9, wherein the second display region is displayed so that the second display region does not overlap the preview image displayed in the third display region.

13. The non-transitory computer readable storage medium according to claim 12, wherein the first display region, the second display region, and the third display region do not overlap with one another.

14. The non-transitory computer readable storage medium according to claim 1, wherein the specific operation includes a contact operation in which an indicator is in contact with the display, wherein the set of program instructions further comprises:

performing a removing process to remove the partial enlarged image from the second display region in response to the contact of the indicator with the display being removed after the second display process displays the partial enlarged image in the second display region.

15. The non-transitory computer readable storage medium according to claim 1, wherein the specific operation includes a contact operation in which an indicator is in contact with the display, wherein the second display process continues displaying the partial enlarged image in the second display region even in a case that the contact of the indicator with the display being removed after the second display image is displayed in the second display region.

16. The non-transitory computer readable storage medium according to claim 1, wherein the printing device is configured to print an image on a roll paper, wherein the generation process generates the print data representing the print image to be printed in the roll paper.

17. An information processing device comprising:

a network interface configured to communicate with a printing device;

a storage storing a database;

a display; and a controller configured to perform:

a first display process to display a database image in a first display region on the display at a first display scale, the database image representing at least partial data included in the database;

a specific reception process to receive a specific operation by the user;

a second display process to display a partial enlarged image, in a second display region on the display at a second display scale greater than the first display scale in response to reception of the specific operation, the partial enlarged image corresponding to an extraction image in a partial extraction region in the database image and being an enlarged image of the extraction image so that the partial enlarged image is displayed in the second display region at the second display scale, the second display region overlapping at most a portion of the first display region; and a generation process to generate print data representing a print image to be printed by the printing device, the print image including at least partial data included in the database.

* * * * *